US010555466B2

(12) United States Patent
Gonyer et al.

(10) Patent No.: US 10,555,466 B2
(45) Date of Patent: Feb. 11, 2020

(54) MODULAR AUTOMATED GROWING SYSTEM

(71) Applicants: Daegan Gonyer, Madrid, NY (US); Shaun Jones, Colton, NY (US)

(72) Inventors: Daegan Gonyer, Madrid, NY (US); Shaun Jones, Colton, NY (US)

( * ) Notice: Subject to any disclaimer, the term of this patent is extended or adjusted under 35 U.S.C. 154(b) by 426 days.

(21) Appl. No.: 15/376,080

(22) Filed: Dec. 12, 2016

(65) Prior Publication Data

US 2017/0099790 A1    Apr. 13, 2017

Related U.S. Application Data

(63) Continuation-in-part of application No. 14/090,869, filed on Nov. 26, 2013, now Pat. No. 9,516,822.

(60) Provisional application No. 61/729,754, filed on Nov. 26, 2012.

(51) Int. Cl.
| | | |
|---|---|---|
| *A01G 31/02* | (2006.01) | |
| *F21V 33/00* | (2006.01) | |
| *H05B 37/02* | (2006.01) | |
| *H05B 33/08* | (2006.01) | |
| *F21S 2/00* | (2016.01) | |

(Continued)

(52) U.S. Cl.
CPC ............. *A01G 31/02* (2013.01); *F21S 2/005* (2013.01); *F21V 33/00* (2013.01); *H05B 33/0872* (2013.01); *H05B 37/0218* (2013.01); *F21Y 2113/13* (2016.08); *F21Y 2115/10* (2016.08); *Y02P 60/216* (2015.11)

(58) Field of Classification Search
CPC ........ A01G 31/00; A01G 31/02; A01G 31/06; A01G 2031/006; A01G 9/022; A01G 27/003; A01G 27/005; A01G 27/006; A01G 9/14; A01G 9/24; A01G 27/02; A01G 9/20; A01G 9/247; A01G 9/26; A01G 7/045; H05B 37/0218; H05B 33/0872; H05B 33/0845; H05B 33/0854
USPC ............. 47/62 A, 62 N, 63, 62 R, 59 R, 60, 47/1.01 R, 65.5, 66.6, 79, 48.5, DIG. 6, 47/58.1 LS
See application file for complete search history.

(56) References Cited

U.S. PATENT DOCUMENTS

| | | |
|---|---|---|
| 3,053,011 A | 9/1962 | Silverman |
| 4,332,105 A | 6/1982 | Nir |
| 4,937,969 A | 7/1990 | Kawabe |

(Continued)

*Primary Examiner* — Trinh T Nguyen
(74) *Attorney, Agent, or Firm* — Dennis B. Danella, Esq.; Woods Oviatt Gilman LLP

(57) ABSTRACT

A growth system for growing vegetation is provided, and includes a plurality of modular growing units defining a vegetative zone; a plurality of lighting units including a lighting node for selectively emitting first and/or second wavelengths of light in the vegetative zone; an unpressurized reservoir for housing a fluid containing one or more nutrients; a nutrient feeding system for fluidly connecting each of the modular units to the reservoir in parallel; and a pump in fluid communication between the reservoir and the modular units. When a modular unit is connected to the respective quick connect valve, the nutrient feeding system directs the fluid to the modular unit, and when the modular unit is disconnected from the valve, the valve is configured for preventing the fluid from flowing from the reservoir through the valve, and the other modular units connected to the nutrient feeding system remain fluidly connected to the reservoir.

19 Claims, 10 Drawing Sheets

(51) Int. Cl.
  *F21Y 113/13* (2016.01)
  *F21Y 115/10* (2016.01)

(56) References Cited

U.S. PATENT DOCUMENTS

| | | |
|---|---|---|
| 5,394,647 A | 3/1995 | Blackford, Jr. |
| 5,771,634 A | 6/1998 | Fudger |
| 6,233,870 B1 | 5/2001 | Horibata |
| 8,074,397 B2 * | 12/2011 | Yoneda .................. A01G 7/045 47/1.01 R |
| 2008/0229661 A1 | 9/2008 | Brooke |
| 2009/0007486 A1 | 1/2009 | Corradi |
| 2009/0126269 A1 | 5/2009 | Wilson |
| 2009/0223128 A1 | 9/2009 | Kuschak |

* cited by examiner

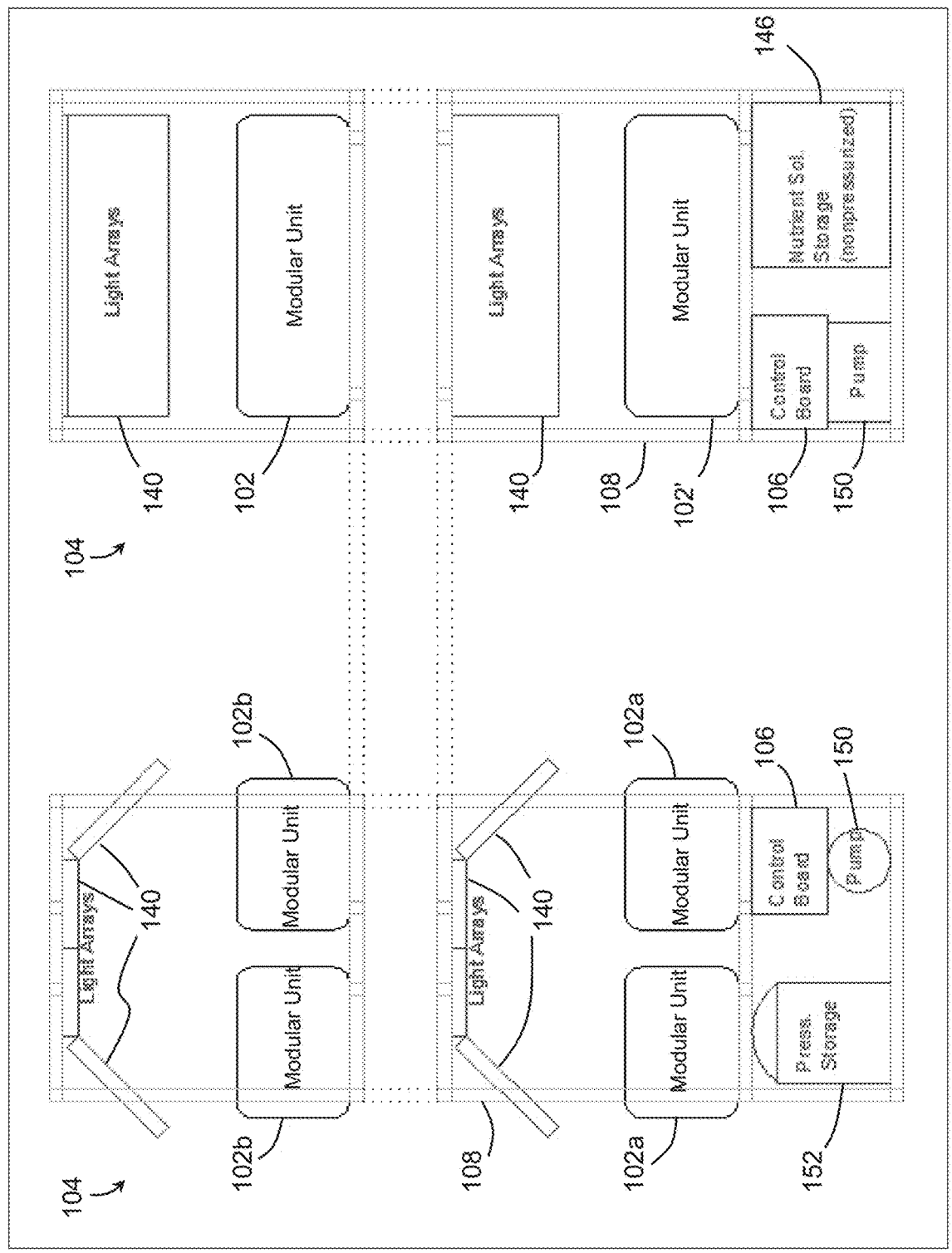

MODULAR AUTOMATED GROWING SYSTEM

CROSS-REFERENCE TO RELATED APPLICATIONS

This continuation-in-part application claims the benefit of pending U.S. patent application Ser. No. 14/090,869, filed Nov. 26, 2013, entitled MODULAR AUTOMATED AEROPONIC GROWTH SYSTEM, which claims the benefit of U.S. Provisional Application No. 61/729,754, filed Nov. 26, 2012, both of which are incorporated herein by reference.

STATEMENT REGARDING FEDERALLY SPONSORED RESEARCH OR DEVELOPMENT

This invention was made with government support under Contract Number. SU-8347570 awarded by the Environmental Protection Agency. The government has certain rights in the invention.

FIELD OF THE INVENTION

The present patent application is directed to a modular automated growth system for growing different types of plants; in particular the system includes a plurality of modular growing units that are fluidly connected to a pressurized nutrient source in parallel and configured to be easily removed and added to provide a scalable plug and play growth system. When used as an aeroponic growth system, the system may also utilize certain nozzle spacing, spray direction and cone angles to reduce variation in the growth of plants by minimizing dry and wet root areas, as well as minimizing the loss of nutrients. Alternatively, the system may be used as an aquaponic system or as a hydroponic system, including hydroponic drip systems, hydroponic ebb and flow systems, hydroponic deep culture system. The system further provides for automated control and monitoring to customize the nutrient delivery, lighting and ambient conditions to increase the effectiveness of the system.

BACKGROUND OF THE INVENTION

Terrestrial farming has existed for millenia. However, it has only been in the last few decades that alternative plant growing systems have been widely adopted; such systems include hydroponics, aquaponics and aeroponics. These alternative growing systems have attempted to alleviate the many issues inherent in terrestrial-based farming. For instance, terrestrial farming requires a large area of arable land, abundant quantities of water, and in many commercial farming operations, large amounts of chemicals, including herbicides, pesticides and fungicides. Terrestrial farming is also subject to the vagaries of nature, including devastation caused by floods, droughts, fires and frosts/freezes. Each of the exemplary alternative systems seeks to address one or more of these drawbacks of terrestrial farming.

As implied by its name, hydroponics involves growing plants within a water medium. That is, plant roots may be suspended directly within a pool of water or may be supported by an inert medium, such as perlite or gravel which is saturated with water. The plant roots are exposed to a nutrient-rich solution to promote plant growth. A number of hydroponic techniques have been developed, including continuous-flow hydroponics wherein the nutrient solution slowly flows past the plant roots; drip hydroponics where nutrient solution is pumped from a reservoir to slowly drip onto the top surface of the inert medium and flow past the roots before being recycled in the nutrient reservoir; ebb and flow hydroponics wherein the plant container is continuously flooded with nutrient solution and then allowed to drain; and deep water culture wherein the plant roots are suspended within the water/nutrient solution while an air pump bubbles oxygen into the solution for root uptake. Each of these systems provides for closed-environment growing thereby reducing the need for harmful chemicals. However, hydroponics remains a water-intensive alternative to terrestrial farming.

Similar to hydroponics is aquaponics wherein a hydroponics plant growing system is symbiotically coupled to an aquaculture system used for raising aquatic animals in a closed system. Aquaponics utilizes the water that used to cultivate aquatic animals as the nutrient feedstock for the plants being grown in the hydroponic system. That is, animals in the aquaculture pool produce nitrogen-rich excretions which will eventually poison the water. However, this nitrogen-rich water is cycled to the hydroponic system wherein the plants use the nitrogen as plant nutrients, thus removing the nitrogen from the water. The water is then recycled to the aquaculture system for use in cultivating the aquatic animals. While aquaponics may symbiotically couple hydroponics with aquaculture, aquaponics, by its nature, requires a vast amount of water to grow both the animals and the plants. Nevertheless, aquaponics is a viable alternative to terrestrial farming.

Aeroponics is a process of growing plants using air as the growth medium. In an aeroponic system, the plant is suspended such that its stems, leaves and any fruit grow in a vegetative zone above the suspension medium. The roots dangle below the suspension medium in an area commonly referred to as a root zone. The dangling roots receive water and other nutrients through an atomized spray of nutrient-laden water commonly referred to as "nutrient tea."

Aeroponics has been known in the art for decades and is generally either a low pressure system or a high pressure system. High pressure aeroponic systems offer numerous benefits over low pressure systems such that high pressure systems are nearly exclusively utilized within large commercial systems. Additionally, as the price and availability of system components have become more amenable to hobbyists, high pressure systems have increasingly become adopted by home gardeners.

In operation, high pressure aeroponic systems pressurize the nutrient tea and spray it through an atomizer or mister that aerosolizes the tea directly onto the root zone. In this manner, aeroponics offers significant advantages over hydroponics (which utilizes a liquid growing medium) and geoponics (which uses soil or other aggregate material as a growing medium). Specifically, by having the roots suspended within air, aeroponic systems increase the availability to oxygen ($O_2$) and carbon dioxide ($CO_2$) to the plant roots. Both atmospheric gases are vital to plant growth such that aeroponically grown plants grow faster and healthier than other systems.

While aeroponic systems provide numerous benefits over other growing systems, there still exist drawbacks with current aeroponic systems. Among these issues is poor crop reliability. Specifically, present aeroponic systems utilize spray systems which provide water droplets either from the bottom up or from the side wall of the aeroponic container. The spray pattern of the misters may be interfered with and degraded by the growing root mass. That is, current systems utilize atomizers or other misters which inefficiently spray the nutrient tea such that the root zone experiences regions of "wet" and "dry" zones. Wet zones receive too much nutrient tea such that gas exchange ($O_2$ and/or $CO_2$) is hindered, while dry zones do not receive sufficient nutrient tea (if any at all) such that nutrient uptake by the roots is inadequate. In either case, wet zones and dry zones negatively affect plant growth and fruit production.

Within each of the alternative growing methods described above, a further deficiency in the art is the inability to efficiently add, remove, modify or otherwise manipulate a modular growing system. While current systems known in the art have been designed to be expanded, this expansion is highly cumbersome and directly impacts plant growth and productivity. For instance, high pressure aeroponic systems deliver nutrient tea through atomizers or other misters operating at pressures in excess of 75-80 psi. Currently available aeroponic systems require operators to turn off the pressure system to the entire system when expanding or otherwise manipulating or repairing a single aeroponic unit or individual component thereof (i.e., replacing a clogged atomizer). Indeed, some systems even require re-priming of the pump(s) before the pressure system is brought back online.

Finally, present aeroponic systems employ control systems that are not integrated for central control. These systems often contain analog controllers. Thus, the availability for process automation, automatic system error detections (e.g., insufficient spray pressure, individual atomizer malfunction, etc.) is not possible with currently available systems.

Accordingly, what is needed is a "plug-and-play" system which allows for efficient maintenance and/or expansion of individual units within the system without interrupting or otherwise disturbing the operation of other individual aeroponic units. What is further needed is an aeroponic system having atomizers/misters and unit constructions which minimize the occurrence of wet or dry zones within the root zone. What is further needed is an automated digital control system that runs preprogrammed spray operations; monitors and controls the temperature, humidity (i.e., activation of the misters), $CO_2$ levels, light quality, light intensity, and other suitable plant growth parameters; and initiates alarms in the event of high or low sensor readings, pump failure, pressure loss, water loss, power failure or the occurrence of any other monitored process variable. The present invention fulfills these and other needs.

SUMMARY OF THE INVENTION

In accordance with one aspect, to address the above-referenced drawbacks of the existing art, the present invention provides a growth system for growing vegetation. The system comprises a plurality of modular growing units configured for supporting vegetation, wherein each of the plurality of modular growing units define a root zone and a vegetative zone. A lighting system comprises a plurality of lighting units with a respective lighting unit associated with a respective modular growing unit of the plurality of the modular growing units. Each respective lighting unit includes two or more lighting nodes with the nodes configured for emitting light in the vegetative zone having differing wavelengths. An unpressurized reservoir is configured for housing a fluid containing one or more nutrients and a nutrient feeding system is configured for fluidly connecting each of the plurality of modular growing units to the unpressurized reservoir in parallel. The nutrient feeding system includes a respective quick connect valve associated with each of the plurality of modular growing units. A pump is in fluid communication between the unpressurized reservoir and the plurality of modular growing units. The pump is configured for drawing the fluid from the unpressurized reservoir to the nutrient feeding system. When one or more of the plurality of modular growing units is connected to an associated quick connect valve, the nutrient feeding system directs the fluid to the modular growing unit. When one or more of the plurality of modular growing units is disconnected from the associated quick connect valve, the quick connect valve is configured for preventing the fluid from flowing from the unpressurized reservoir through the quick connect valve, and the other modular growing units connected to the nutrient feeding system remain fluidly connected to the unpressurized reservoir.

The system may also include a pressurized reservoir is configured to provide pressurized fluid to the nutrient feeding system. The pump is in fluid communication between the unpressurized reservoir and the pressurized reservoir and is configured for drawing the fluid from the unpressurized reservoir into the pressurized reservoir and pressurizing the fluid in the pressurized reservoir. A plurality of pressure regulators may also be in fluid communication between the pressurized reservoir and each of the modular growing units. Each of the pressure regulators is configured to step down the pressure of the fluid before the fluid is supplied to its associated modular growing unit. A system controller may be in communication with the plurality of pressure regulators wherein the system controller is configured for independently adjusting the plurality of pressure regulators to control the pressure of fluid that is provided to the modular growing units through the nutrient feeding system.

In a further aspect of the present invention, at least one of the plurality of modular growing units may be a modular aeroponic unit. The growth system may further comprise a plurality of spray valves in fluid communication between the pressurized reservoir and the modular aeroponic unit. Each of the plurality of spray valves is configured for selectively allowing the fluid to flow from the pressurized reservoir to the modular aeroponic unit. The modular aeroponic unit includes a top wall, a bottom wall, and a side wall extending between the top wall and the bottom wall, wherein the top wall, the bottom wall, and the side wall define the root zone. A portion of the side wall is disposed at an angle of about 95 degrees to about 105 degrees relative to the top wall, wherein the portion of the side wall provides support for the at least one spray nozzle. The at least one spray nozzle includes a cone angle of about 90 degrees to about 130 degrees. A system controller may be in communication with the plurality of spray valves wherein the system controller is configured for independently adjusting the plurality of spray valves to control the amount of fluid that is provided to the modular aeroponic unit through the nutrient feeding system.

In another aspect of the present invention, a system controller is in communication with each of the lighting nodes such that each of the lighting nodes is controlled independently by the system controller. The system controller may be configured to output a pulsed width modulated control signal to selectively control the duration and intensity of light emitted by each of the lighting nodes. The lighting nodes may include light emitting diodes (LED). One or more sensors may also be in communication with the system controller wherein the system controller is configured for collecting data related to system using the one or more sensors. The system controller may include a display for displaying the data collected from the one or more sensors. The one or more sensors may also include a light sensor, an environmental sensor, or a nutrient solution sensor. Each of the plurality of modular growing units may include a respective light sensor. The system controller may selectively control each lighting node to produce a desired blend of ambient light and artificial light emitted by the lighting node.

In a further aspect of the present invention, a memory may be in communication with the system controller wherein the data collected from the one or more sensors is stored in the memory. The memory may be in communication with the system controller through a network. At least one remote computing device may be in communication with the system controller through a network, wherein the at least one remote computing device includes a software application program that is configured for displaying the data collected by the system controller, independently controlling the plurality of lighting units, and selectively allowing the fluid to flow from the pressurized reservoir to the plurality of modular aeroponic units.

In another aspect, the present invention is directed to a growth system for growing vegetation. The system comprises a plurality of modular growing units, a lighting system, an unpressurized reservoir, a nutrient feeding system, and a pump. The plurality of modular growing units are configured for supporting vegetation, wherein each of the plurality of modular growing units define a root zone and a vegetative zone. The lighting system comprises a plurality of lighting units, wherein each of the plurality of lighting units are associated with a respective modular growing unit of the plurality of the modular growing units. Each of the plurality of lighting units include at least one lighting node that is configured for selectively emitting a first wavelength of light in the vegetative zone, a second wavelength of light in the vegetative zone, and the first and second wavelengths of light in the vegetative zone, and wherein the first wavelength of light is different than the second wavelength of light. The unpressurized reservoir is configured for housing a fluid containing one or more nutrients. The nutrient feeding system is configured for fluidly connecting each of the plurality of modular growing units to the unpressurized reservoir in parallel, wherein the nutrient feeding system includes a respective quick connect valve associated with each of the plurality of modular growing units. The pump is in fluid communication between the unpressurized reservoir and the plurality of modular growing units, wherein the pump is configured for drawing the fluid from the unpressurized reservoir to the nutrient feeding system. When one or more of the plurality of modular growing units is connected to the respective quick connect valve, the nutrient feeding system directs the fluid to the modular growing unit. When one or more of the plurality of modular growing units is disconnected from the respective quick connect valve, the quick connect valve is configured for preventing the fluid from flowing from the unpressurized reservoir through the respective quick connect valve, and the other modular growing units connected to the nutrient feeding system remain fluidly connected to the unpressurized reservoir.

The growth system may further include a plurality of pressure regulators in fluid communication between the pressurized reservoir and each of the modular growing units, wherein each of the pressure regulators is configured to step down the pressure of the fluid before the fluid is supplied to the associated modular growing unit. The system may further comprise a system controller in communication with the plurality of pressure regulators, wherein the system controller is configured for independently adjusting the plurality of pressure regulators to control the pressure of fluid that is provided to the modular growing units through the nutrient feeding system.

In a further aspect, the at least one lighting node in the growth system may include a plurality of lighting nodes, wherein the system further comprises a system controller in communication with each of the plurality of lighting nodes, and wherein each of the plurality of lighting nodes is controlled independently by the system controller. The system controller may be configured to output a pulsed width modulated control signal to selectively control a duration and an intensity of the first wavelength of light, the second wavelength of light, and the first and second wavelengths of light.

In yet another aspect, the growth system may further include a light sensor and a system controller. The light sensor is associated with at least one of the plurality of modular growing units, wherein the light sensor is disposed in the vegetative zone, and wherein the light sensor is configured for detecting a spectral dispersion of ambient light in the vegetative zone. The system controller is in communication with the light sensor and the at least one lighting node. The system controller is configured for receiving data representative of the spectral dispersion detected by the light sensor, and selectively controlling the at least one lighting node to emit at least one of the first wavelength of light in the vegetative zone, the second wavelength of light in the vegetative zone, and the first and second wavelengths of light in the vegetative zone based on the data representative of the spectral dispersion. The at least one lighting node may include a first light emitting diode and a second light emitting diode, wherein the first light emitting diode is configured to emit the first wavelength of light, and wherein the second light emitting diode is configured to emit the second wavelength of light. The system controller may be configured to output a pulsed width modulated control signal to selectively control a duration and an intensity of the first wavelength of light emitted by the first light emitting diode, the second wavelength of light emitted by the second light emitting diode, and the first and second wavelengths of light emitted by the first and second light emitting diodes, respectively.

BRIEF DESCRIPTION OF THE DRAWINGS

The accompanying drawings form a part of this specification and are to be read in conjunction therewith, wherein like reference numerals are employed to indicate like parts in the various views, and wherein:

FIG. 2 is a schematic front view drawing of a group of stacked modular units;

FIG. 3 is a schematic side view drawing of the group of stacked modular units shown in FIG. 2;

DETAILED DESCRIPTION OF THE INVENTION

In general, the present invention provides a modular "plug-and-play" growth system which allows for efficient maintenance and/or expansion of individual modular growing units within the system without interrupting or otherwise disturbing the operation of other individual modular units. In this manner, the system of the present invention may simultaneously accommodate any number of modular growing units employing a variety of alternative growing systems, including but not limited to aeroponics, drip hydroponics, ebb and flow hydroponics, deep culture hydroponics and aquaponics.

The present system also provides an automated system controller that may implement preprogrammed system operations, monitor and control the temperature, humidity, $CO_2$ levels, light quality, light intensity, and other suitable plant growth parameters, and initiate alarms in the event of high or low sensor readings, pump failure, pressure loss, water loss, power failure or the occurrence of any other monitored process variable. It will be understood that the components and methods described herein for providing a modular automated growth system for plants may be implemented in hardware, software or a combination thereof.

With regard to aeroponic growing systems, the present system may also configure the positioning and cone angles of the atomizers/misters (referred to herein as "spray nozzles") and the structure of the modular aeroponic units to minimize the occurrence of wet or dry zones within a root zone.

Figure 1:
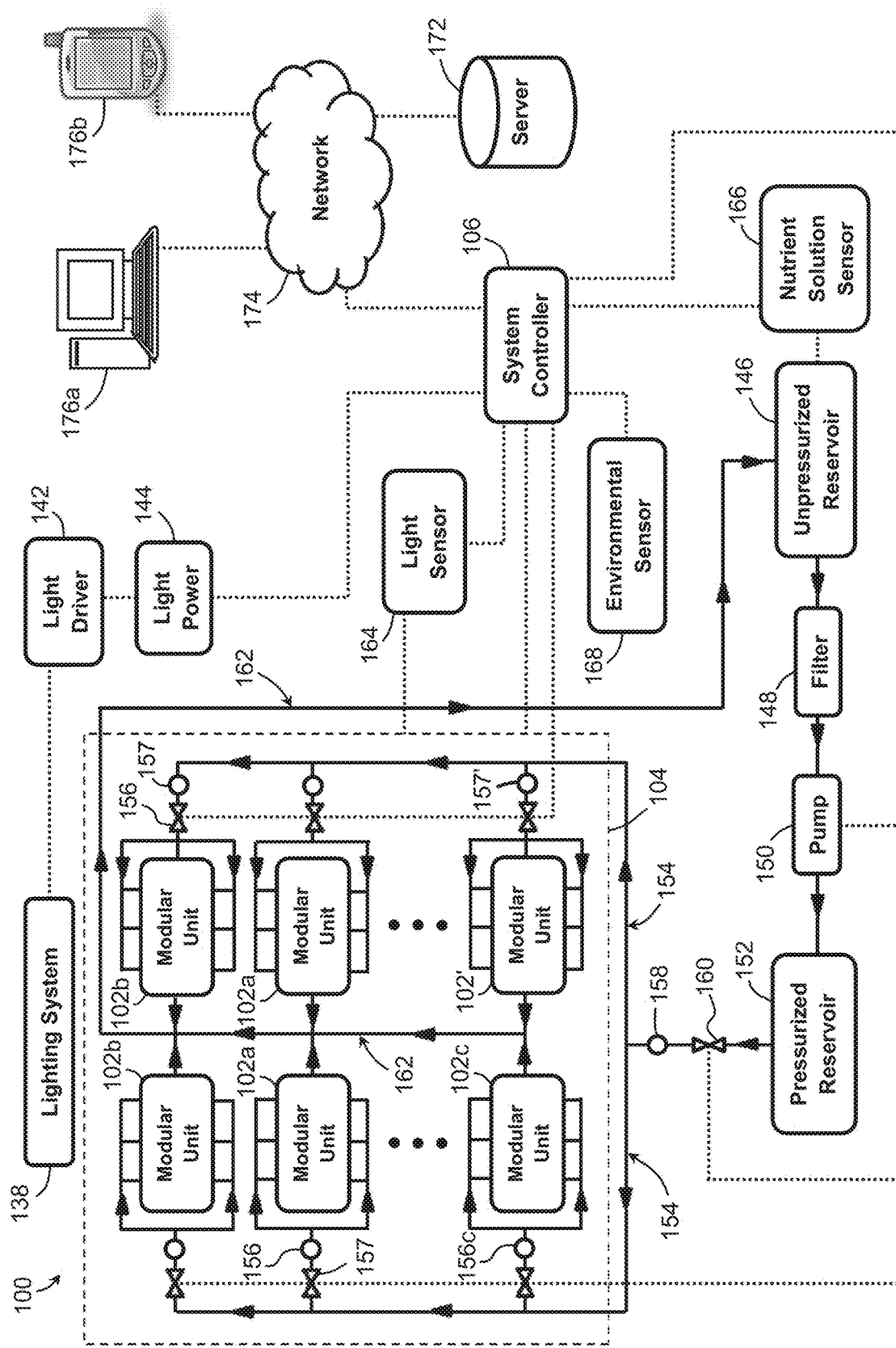
FIG. 1 is a schematic drawing of a modular automated growth system in accordance with the present invention.
Figure 4:
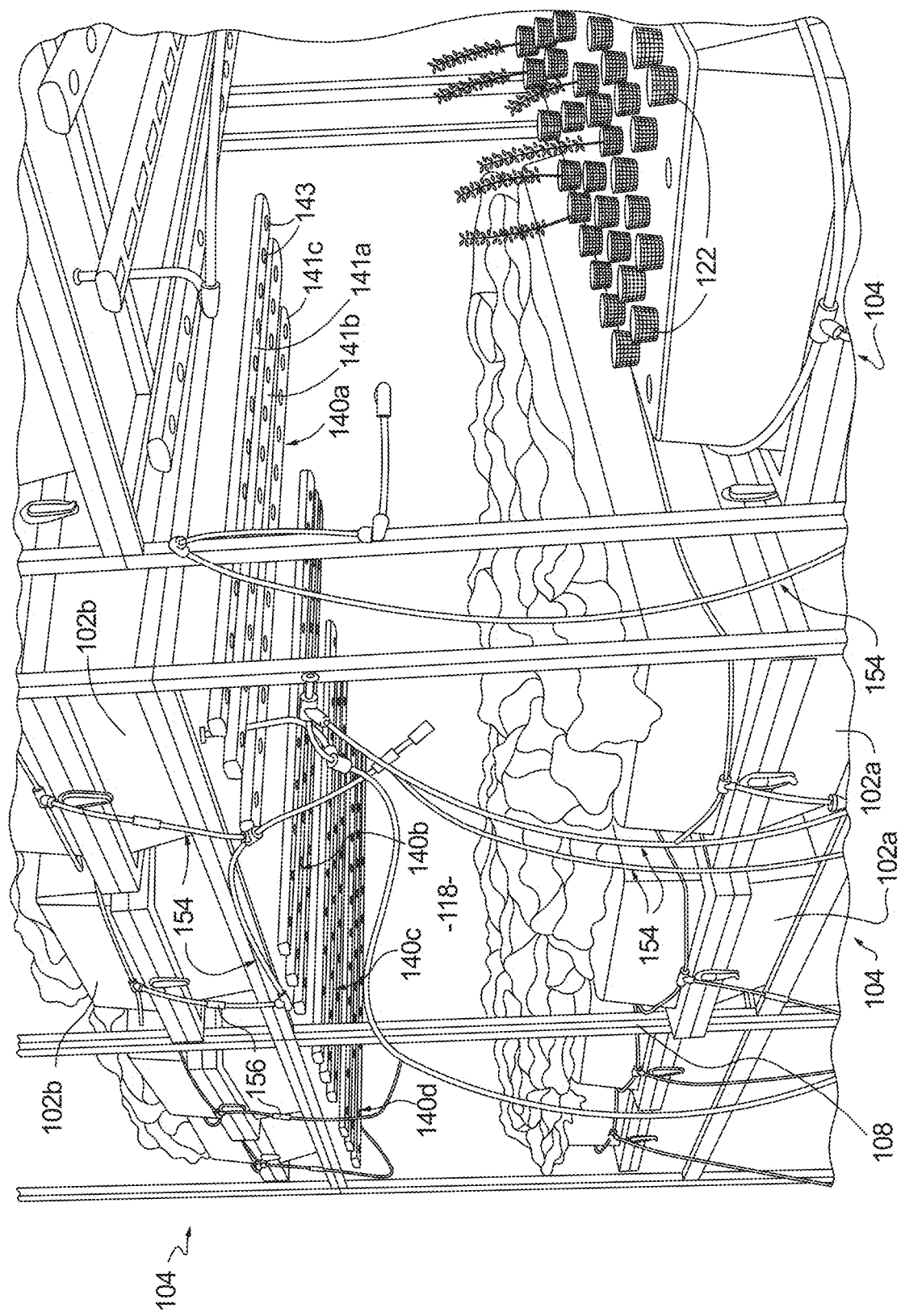
FIG. 4 is a schematic drawing of a plurality of groups of modular units.

Referring to the drawings in detail, and specifically to FIG. 1, a modular automated aeroponic growth system according to one aspect of the present invention is generally designated as reference numeral 100. System 100 includes a plurality of modular aeroponic units 102 (hereinafter "modular units") configured for supporting vegetation growth. Modular units 102 may be arranged or stacked to form a group 104, wherein each group 104 may include two or more modular units 102. For example, as best seen in FIGS. 2-4, system 100 may include a group 104 including two modular units 102a positioned next to one another on a bottom shelf of a metal rack 108, and two modular units 102b positioned next to one another on a top shelf of metal rack 108. It will be understood that system 100 may include one or more groups 104 that are in communication with a system controller 106, as seen in FIG. 4. System controller 106 is configured to control and/or monitor the one or more groups 104 as a whole, or each of the modular units 102 on an individual basis. The control and monitoring of modular units 102 by system controller 106 will be described in more detail below. While shown and described as modular aeroponic units, it should be understood by those skilled in the art that any one or more aeroponic units may be swapped or replaced with a hydroponic unit 102' employing any suitable hydroponic technique, such as but not limited to drip hydroponics, ebb-and-flow hydroponics or deep culture hydroponics.

As best seen in FIGS. 5-8, each modular aeroponic unit 102 includes a top wall 110, a bottom wall 112, and a side wall 114 extending between top wall 110 and bottom wall 112. The combination of top wall 110, bottom wall 112, and side wall 114 define a root zone 116 within modular unit 102 that is configured to house the roots of a plant that is supported by modular unit 102. The area outside modular unit 102, particularly above top wall 110, is designated as a vegetative zone 118 and is used to accommodate the vegetative portion of the plant. The root zone 116 is isolated from vegetative zone 118 to eliminate nutrient spray on the vegetative zone. Top wall 110 may have a plurality of apertures 120 formed therein configured for receiving and supporting the plant in the proper position with respect to modular unit 102. A vegetation holder 122 (FIG. 4) may be used to assist with supporting plant in aperture 120. It should be further noted that any alternative hydroponic units will also similarly define a vegetative zone and a root zone as described above.

In one exemplary embodiment, side wall 114 may be split into two parts 114a, 114b wherein one portion of the side wall 114a extends upwardly from a parting line 124 toward top wall 110, and the other portion of the side wall 114b extends downwardly from the part line 124 toward bottom wall 112. Side walls 114a, 114b may be secured to one another by one or more fastening mechanisms 126 with a gasket 128 positioned therebetween to seal the two halves. In another example, modular unit 102 does not include side wall 114a, and top wall 110 extends straight across forming the top half of modular unit 102. In either case, in one aspect of the present invention, at least a nozzle support portion of side wall 114 is disposed at an angle of between about 95 degrees and about 105 degrees relative to top wall 110, and preferably about 101 degrees relative to top wall 110.

Figure 6:
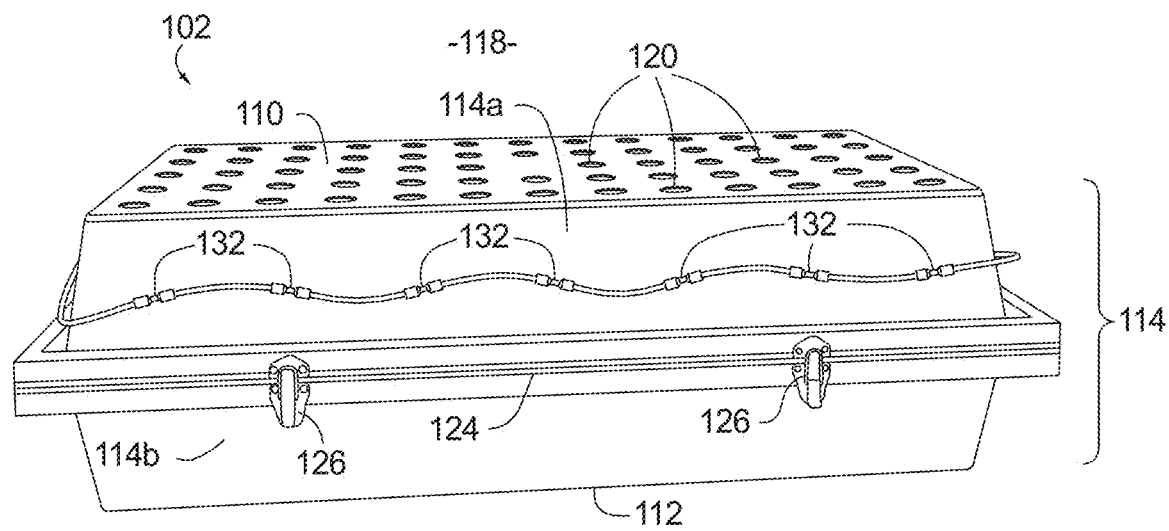
FIG. 6 is a schematic drawing showing a side view of the modular aeroponic unit shown in FIG. 5.
Figure 7:
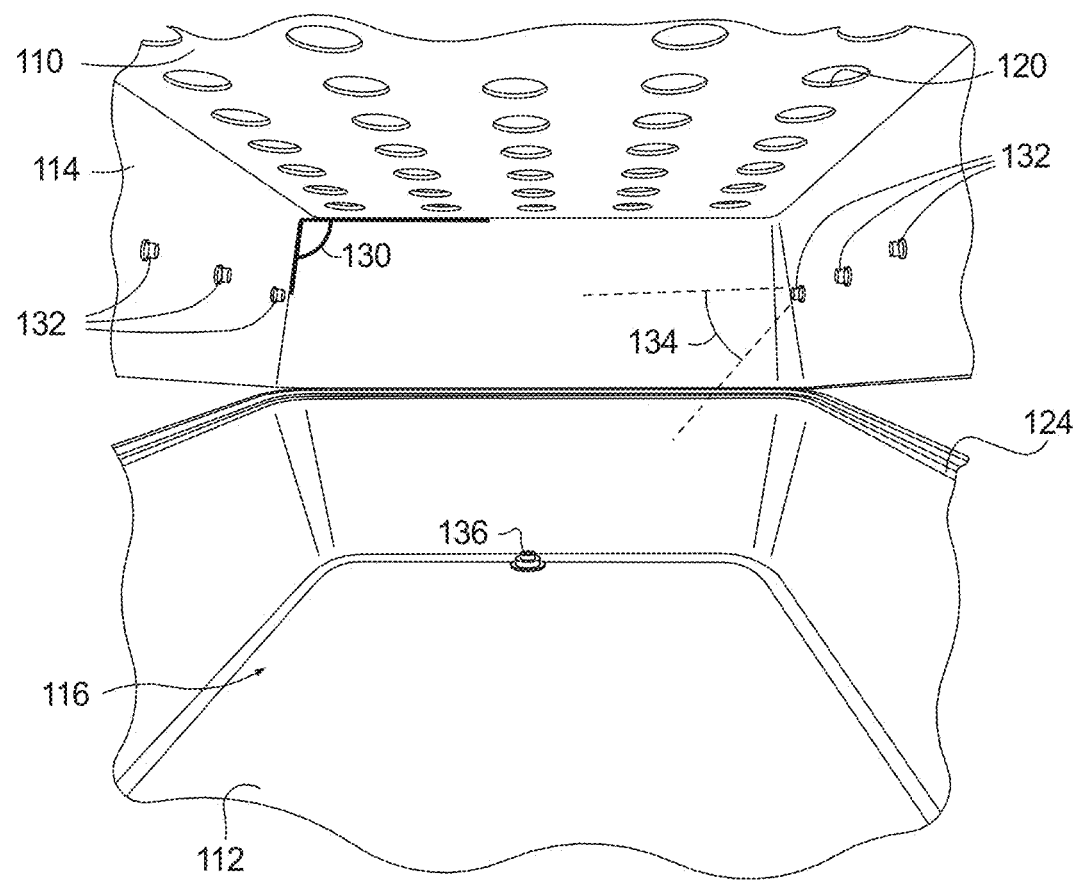
FIG. 7 is a schematic drawing showing the inside of the modular aeroponic unit shown in FIG. 5.
Figure 8:
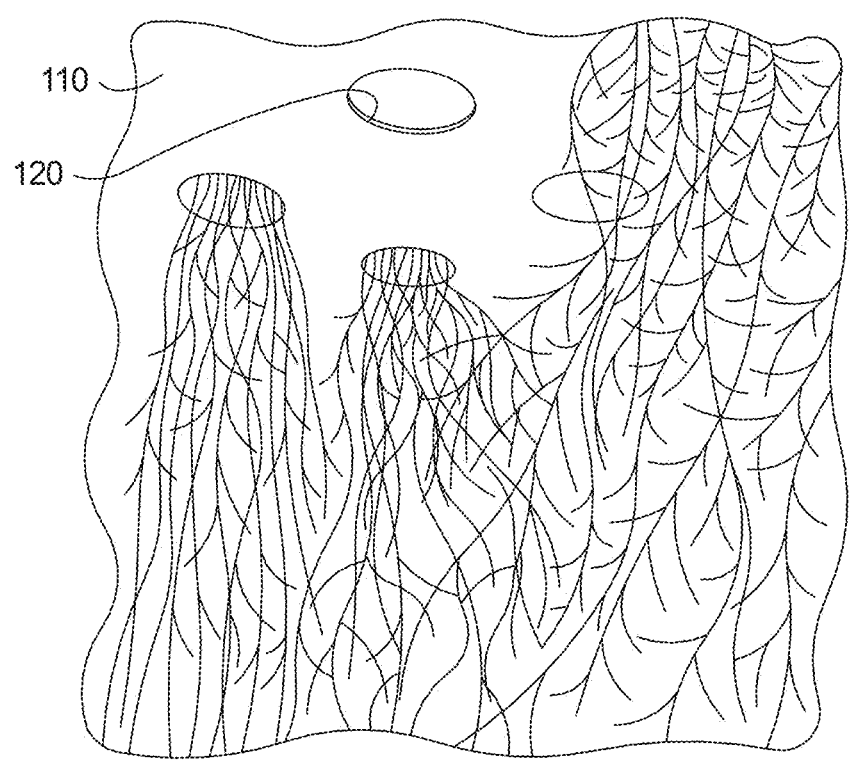
FIG. 8 is a schematic drawing showing the inside surface of the top wall of the modular aeroponic unit shown in FIG. 5.

As best seen in FIGS. 6 and 7, the nozzle support portion of side wall 114 is configured for providing mounting locations for a plurality of spray nozzles 132, wherein spray nozzles 132 are directed into root zone 116. When the fluid mist is emitted from spray nozzle 132, the mist forms a cone pattern with the apex at the orifice formed in spray nozzle 132, and spreading outwardly therefrom. A cone angle is the angle from quadrant to apex to opposing quadrant (i.e., the side view of the cone looks like "<" and the cone angle is the angle between the two lines. In another aspect of the present invention, at least one of spray nozzles 132 includes a cone angle 134 of about 90 degrees to about 130 degrees, and preferably about 110 degrees. Further, spray nozzles 132 may be mounted within nozzle support locations about 6 inches from one another. The combination of the side wall angle, cone angle of spray nozzles, and the spacing of the spray nozzles provide an equilateral coverage of the spray pattern throughout root zone 116. As best seen in FIG. 7, modular unit 102 further includes an outlet 136 defined in bottom wall 112, which allows unused or residual fluid sprayed by spray nozzles 132 (not absorbed by the vegetation roots) to be removed from modular unit 110 using a gravity siphon or a pump.

The angle 130 of the side walls 114 in conjunction with cone angle 134 and relative placement of spray nozzles 132 dictate a number of things. One aspect it dictates is the direct water loss of system 100 by limiting the over spray (i.e., the nutrient mist that leaves system 100 through apertures 120 in top wall 110), which then hits the plant leaves and causes adverse health effects on the plants, as well as general fluid and nutrient depletion of system 100. This can be limited by using vegetation holder 122 that seals apertures 120, but system 100 is often used with mesh or other supports that do not seal apertures 120. By properly controlling side wall 114 and spray cone angles 134, the amount of mist being lost in this fashion can be reduced without other adverse effects in spray pattern (e.g., dry spots, penetration). These two angles 130, 134 with nozzle spacing also dictate the volume coverage of the spray pattern in root zone 116 of modular unit 102. Making the spray pattern as even as possible reduces variation in the growth of plants placed in different locations in modular unit 102, and eliminates dry spots as well as wet spots (i.e., areas that receive excessive watering as a result of location). The side wall angle 130 dictates the primary angle of the spray pattern from the nozzle (centering in a pattern angled downward from horizontal the same angle as the side wall angle from vertical), which contributes to the ability of the spray cone to penetrate root zones. This also contributes to even coverage in the dense root zones of mature plants.

With reference to FIG. 1, system 100 further includes a lighting system 138 associated with modular units 102 and configured for emitting light in vegetative zone 118. In one embodiment, lighting system 138 may include a plurality of lighting units 140, for example lighting units 140a, 140b, 140c, 140d (FIGS. 2-4), wherein each of modular units 102 is associated with a separate lighting unit 140a, 140b, 140c, 140d. Further, it should be understood that each lighting unit 140a-140d may include one or more light arrays 141a, 141b, 141c, as seen in FIG. 4. Lighting units 140a-140d may be driven by a light driver 142 and powered by a power source 144. Light driver 142 may drive a plurality of lighting units 140a-140d uniformly, or each lighting unit 140a-140d independent of one another. The lighting arrays 141a-141c that form each of the lighting units 140 may have a flat orientation (FIG. 4) or an angled orientation (FIG. 2). Further, lighting units 140 may include light emitting diodes (LED) or a fluorescent light source. Lighting units 140 may be, for example, the Eclipse F1 or F6 distributed by Illumitex, Austin, Tex.

In a further aspect of the present invention, each lighting unit 140 may include a plurality of lighting nodes 143, such as LED nodes, as seen in FIG. 4. With additional reference to FIG. 12, each LED node 143 may further be comprised of one or more individual diodes 145. Each of diodes 145 included in LED nodes 143 may be selected to output light of a selected wavelength as determined by the semiconductor used in the diode. For example, individual diodes 145a, 145b, 145c, 145d may be selected to emit one or more wavelengths in one of the blue (450 nm to 495 nm), orange (590 nm to 620 nm), red (620 nm to 750 nm) and far red (710 nm to 850 nm) spectral regions, wherein there may be overlap in the red and far red segments of the spectrum. Such spectral regions may be selected because it has been found that blue and red wavelengths drive photosynthesis, far red wavelengths are a metabolic indicator (usually associated with change between night and day) and orange wavelengths can signal seasonal and reproductive patterns.

Figure 12:
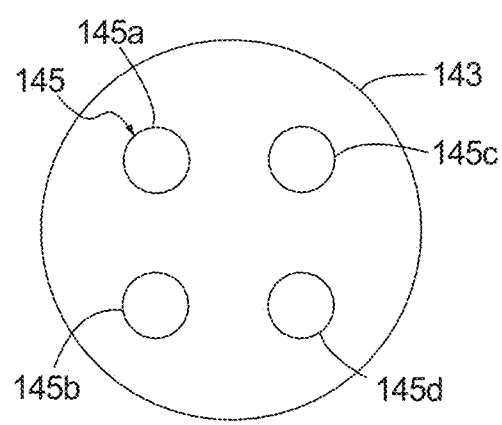
FIG. 12 is a schematic drawing of an exemplary lighting node including a plurality of individual diodes.

It should be understood that the present invention is not limited to any particular orientation of diodes 145, or any particular shape or structure of light nodes 143. For example, the shape of the structure that forms lighting nodes 143 may be circular, as seen in FIG. 12, linear, square grid or any other type of structure. Moreover, LED node 143 may include multiple diodes 145 to emit artificial light more fully over the wavelengths within a particular spectral region, e.g. the blue region of the spectrum (450 nm to 495 nm). In this manner, each lighting unit 140 may output light across a wide spectrum. As discussed in greater detail below, each diode 145 or LED node 143 may be individually and selectively powered via a controller so as to output artificial light at a desired wavelength profile and direct such artificial light at vegetative zone 118 of a respective modular unit 102 to supplement detected ambient light that vegetative zone 118 is being provided to maximize plant growth and yield.

It should be understood the number of diodes 145 used in LED node 143 may be dependent upon the characteristics of the desired wavelengths of light in vegetative zone 118. The smoother the desired spectral output, the more diodes 145 needed to reach a desired resolution, all trained at separate spectral points. The number of diodes 145 may be equivalent to the spectral peaks of interest. If it is desired to provide a photosynthesis driver, the number of diodes 145 would be at least two (one red one blue). In addition, if it is desired to provide a light capable of hitting the seasonal and daily cueing as well, the minimum is four diodes 145. If it is desired to provide a more complete blue region, for example, multiple diodes 145 in the blue spectrum can be used.

Figure 9:
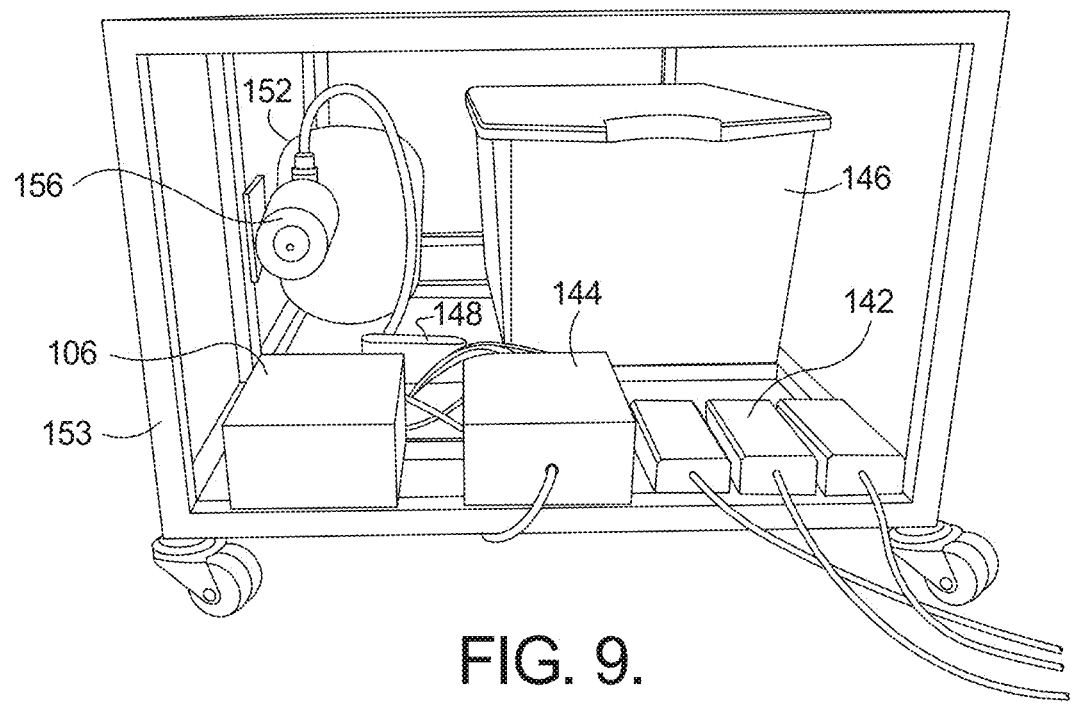
FIG. 9 is a schematic drawing showing a side view of various components used in the system.
Figure 10:
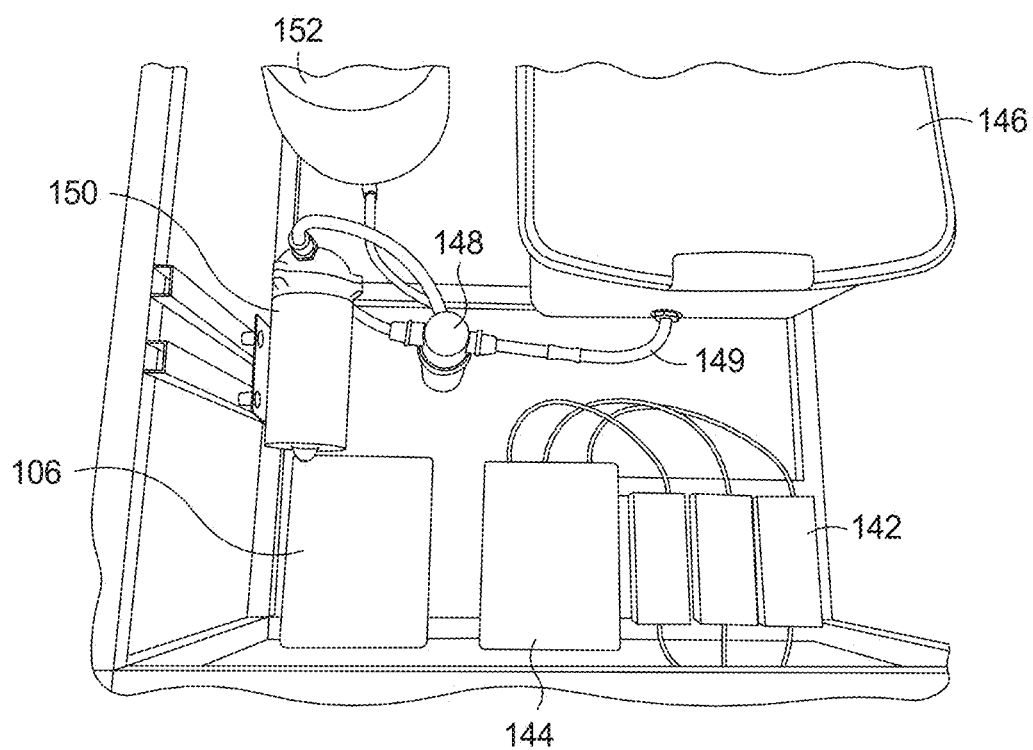
FIG. 10 is a schematic drawing showing a top view of the components shown in FIG. 9.

As best seen in FIGS. 1, 9 and 10, system 100 further comprises an unpressurized reservoir 146 configured for storing a fluid, such as, for example, water, containing one or more nutrients ("nutrient tea"). It will be understood that nutrients may be added to the water, for example, after unpressurized reservoir 146 is filled with water. A filter 148 is in fluid communication and downstream of unpressurized reservoir 146. Filter 148 and unpressurized reservoir may have a quick disconnect pressure stop 149 disposed therebetween. Filter 148 is configured for removing any undesirable impurities contained in the fluid. For example, filter 148 may be a Raw Water Strainer 4477881 distributed by West Marine, Watsonville, Calif. A pump 150 is in fluid communication and downstream of filter 148, and is configured for drawing the nutrient fluid from unpressurized reservoir 146 and through filter 148. Pump 150 may then direct the fluid to the nutrient feed system of any hydroponic units (i.e., to a drip nozzle for drip hydroponics or to temporarily flood the root zone when employing ebb-and-flow hydroponic techniques). Alternatively, pump 150 may charge the fluid into a pressurized reservoir 152 to fill pressurized reservoir 152 to about 100 psi, for example. When employing hydroponic units, each hydroponic unit 102' may include an inline pressure and/or flow regulating valve 157' to down regulate (such as to about 10 psi) the fluid pressure received from pressurized reservoir 152 at each hydroponic unit while also maintaining fluid pressure at any aeroponic units 102 (see FIG. 1). As such, pressurized reservoir 152 houses the fluid containing one or more nutrients until distributed to modular units, such as units 102. Pump 150 may be controlled by a pressure shut off or a timer dictated by the number of modular units 102 in group 104. A support frame 153 may be used as a mounting location or support for the above-referenced components.

As best seen in FIG. 1, and in accordance with another aspect of the present invention, system 100 further includes a nutrient feeding system 154 configured for fluidly and selectively connecting each of modular units 102 to pressurized reservoir 152 in parallel. With additional reference to FIG. 4, nutrient feeding system 154 may include a series of interconnecting tubes that are configured to allow the fluid to pass therethrough. Further, nutrient feeding system 154 may include a pressure stop quick connect valve 156. When used with aeroponic units 102, nutrient feeding system 154 may also include a spray valve 157 associated with each of modular units 102. Spray valve 157 variably controls the amount of fluid that flows to spray nozzles 132 of the associated modular unit 102. When modular unit 102 is connected to an associated pressure stop valve 156, nutrient feeding system 154 directs the fluid through spray valve 157 to spray nozzles 132 associated with modular unit 102 from pressurized reservoir 152. If, for example, a modular unit 102c is disconnected to an associated pressure stop valve 156c, pressure stop valve 156c is configured for preventing the fluid from flowing from pressurized reservoir 156 through pressure stop valve 156c, wherein the other modular units 102 that are connected to nutrient feeding system 154 will remain fluidly connected to pressurized reservoir 156 to feed their respective spray nozzles 132. In other words, a modular unit 102c may be removed from system 100 without interrupting or otherwise disturbing the operation of other modular units 102 that remain connected to pressurized reservoir 156. Likewise, additional modular units 102 may be added to system 100 without interrupting modular units 102 already connected to pressurized reservoir 156.

System 100 may further include a primary pressure stop valve 158 associated with pressurized reservoir 156 to allow an entire group 104 of modular units 102 to be taken off-line, if necessary. Further, a primary valve 160 may be in fluid communication between pressurized reservoir 156 and modular units 102, wherein primary valve 160 is configured for selectively allowing and disallowing the fluid to flow from pressurized reservoir 156 to spray nozzles 132 in modular units 102. Primary valve 160 may also be configured for incrementally varying the amount of the fluid flowing from pressurized reservoir 156 to spray nozzles 132. Primary valve 160 may be any automated valve or solenoid.

System 100 may also include a fluid return system 162 that operates to return the unused or residual fluid from modular units 102 to unpressurized reservoir 146. For example, fluid return system 162 may include tubing that fluidly connects outlets 136 of modular units 102 with unpressurized reservoir 146. As mentioned above, the fluid may be fed to unpressurized reservoir 146 using a gravity siphon or a pump.

As best seen in FIG. 1, system 100 may include one or more sensors for collecting data from certain system components to provide information regarding the efficiency and operation of system 100. For example, separate light sensors 164 may be associated with each of modular units 102 to detect and collect data related to the light quality in terms of photo-synthetically active radiation (PAR), and spectral dispersion of the ambient light that the respective modular unit 102 is exposed to, and/or the spectral intensity and dispersion of the blend of the ambient light and the artificial light provided by the respective lighting unit 140 that the respective modular unit 102 is exposed to. In the alternative, a light sensor 164 may be associated with more than one modular unit 102 depending on the specificity of monitoring desired. A nutrient solution sensor 166 may be associated with unpressurized reservoir 146 and configured for detecting the temperature, pH, electro-conductivity, and nutrient levels of the fluid contained within unpressurized reservoir 146. Further, an environmental sensor 168 may be included to collect ambient data within the area that the modular units 102 are located in, such as, but not limited to, temperature, humidity, $CO_2$, electricity, light quality, and light intensity. It should be understood that the data collected from each of the above-referenced sensors may be by a wired or wireless connection.

In accordance with another aspect, the present invention includes a system controller 106 that is configured to collect, monitor, and store data collected from each of sensors 164, 166, 168. It should be understood that sensors 164, 166, 168 may transmit data to system controller 106 using a wired or wireless connection. The data collected from sensors 164, 166, 168 may be stored real-time in a local memory or remotely on a server 172 via a network 174, such as, for example, the Internet. The stored data may be displayed on a display of system controller 106 to monitor and analyze system 100 real-time or for a given time period using a web-based query system. GUI query based reports may also be generated using the collected data. It should be understood that system controller 106 may operate one or more groups 104 in tandem or independently.

Further, system controller 106 allows separate slave systems to be plugged in and associated with each of modular units 102 that are electronically identified via a wired or wireless connection. A slave system is used in conjunction with system controller 106 to control any parameter or function associated with the corresponding module unit. Once identified by system controller 106, a control module allows each slave system to be controlled separately by system controller 106. In other words, any slave system can be connected to system controller 106, and system controller 106 may control the lighting, spray duration, spray interval, automatically and individualized for each other slave system. For example, system controller 106 may be in communication with spray valves 157 associated with each modular unit 102, wherein system controller 106 is configured for selectively adjusting each of spray valves 157 individually to control the amount of fluid that is provided to each modular unit 102 through nutrient feeding system 154. Therefore system controller 106 may implement custom preprogrammed spray operations for each modular unit 102 based on data collected from sensors 164, 166, 168.

In another example, system controller 106 is configured for independently controlling the duration and intensity of light emitted by each of the plurality of lighting units 140a-140d associated with its respective modular unit 102 using light driver 142. The independent control of the lighting units 140 may be based on data collected from each light sensor 164. As described above, each lighting unit 140a-140d may include a plurality of LED nodes 143, which in turn may be comprised of one or more individual diodes 145. LED nodes 143 may include diodes 145 that are selected such that they collectively may emit a specific or broad spectrum of wavelengths of light, for example, within a specific segment of the spectrum, within two or more segments of the spectrum (e.g., the blue, orange, red and far red segments of the spectrum) or across an entire spectrum. That is, system controller 106 is configured for selectively powering only the one or more diodes 145 which will emit light having a desired wavelength, and independently controlling the duration and intensity provided by each of the selected one or more diodes 145 through, for example, a pulsed width modulation signal.

The determination of which of the one or more diodes 145 to be selectively powered may be based at least in part on data collected from light sensor 164 that is representative of the light in vegetative zone 118. For instance, light sensor 164 is configured to detect the wavelengths of light present within the ambient light in vegetative zone 118 and the spectral intensity (i.e., amplitude) of the wavelengths being directed to vegetative zone 118. Light sensor 164 is configured to transmit the detected ambient light data to system controller 106. System controller 106 receives the ambient light data transmitted from light sensor 164 and compares such ambient light data with one or more desired wavelengths of light and spectral intensity that is preprogrammed into system controller 106, which may be based on preprogrammed parameters. For example, the predetermined parameters may be based on a geographic location, time-of-day and/or time-of-maturity based.

Figure 5:
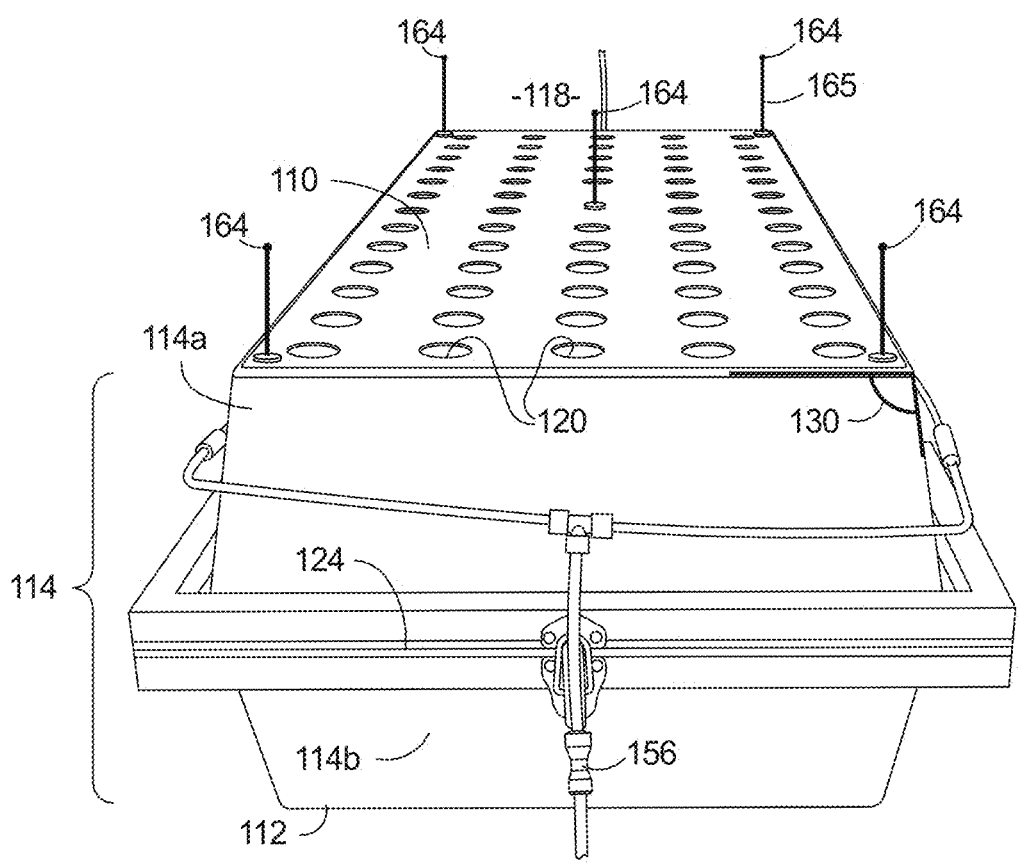
FIG. 5 is a schematic drawing showing a front view of a modular aeroponic unit.

As best seen in FIG. 5, one or more light sensors 164 may be associated with one or more modular growing units 102a-c, 102', wherein light sensor 164 is disposed in vegetative zone 118 and configured for detecting a spectral intensity of ambient light in vegetative zone 118. For instance, light sensor 164 may be disposed on a top surface of a respective modular growing unit, on a corner portion of modular growing unit, or anywhere in the columns between plants depending on the desired resolution. Light sensor 164 may be mounted to an adjustable base 165 (e.g., telescopic base) so that they can be elevated to a current vegetation level as plants grow without being overshadowed. The height of light sensors 164 may be located at or just above the vegetation level for obtaining the best data. Adjustable base 165 may be used to manually adjust the height of light sensors 164 relative to the current vegetative level, or may be automatically adjusted by system controller 106 based upon a measurement of current vegetative level or on an estimated growth level of the vegetation.

If system controller 106 determines that the ambient light data received from light sensor 164 is insufficient in that the ambient light is not providing vegetative zone 118 with one or more desired wavelengths of light and/or that the intensity of one or more wavelengths of light being provided to vegetative zone 118 is insufficient, system controller 106 is configured to activate the one or more diodes 145 that are capable of emitting the one or more wavelengths that are lacking from the ambient light at a desired intensity to bring both the intensity and quality of the resulting blend of artificial light and ambient light within predetermined parameters programmed into system controller 106.

For example, system controller 106 may be preprogrammed to ensure that a predetermined intensity of blue and red spectrum wavelengths are being provided to vegetative zone 118 to drive photosynthesis. It should be understood that any predetermined intensity of wavelength of light may be provided in the form of a range or specific value. Light sensor 164 would be used to detect the wavelength of light and/or the spectral intensity present in vegetative zone 118 (i.e., ambient light data), and transmit the ambient light data to system controller 106. System controller 106 may then compare the ambient light data with the predetermined intensity of blue and red spectrum wavelengths to determine if the ambient light is providing sufficient intensity of blue and red spectrum wavelengths to vegetative zone 118. If the ambient light is providing a sufficient intensity of blue and red spectrum wavelengths, then system controller 106 does not activate the diodes 145 associated with the blue and red spectrum. If system controller 106 determines that the detected blue and red spectrum wavelengths in the ambient light is below the predetermined intensity of blue and red spectrum wavelengths, then system controller 106 operates to selectively activate the diodes 145, for example, diodes 145a, 145b, that are associated with the blue and red spectrum wavelengths to supplement the blue and red spectrum wavelengths in vegetative zone 118 to help drive photosynthesis. Light sensor 164 may thereafter take one or more additional readings of the artificial light provided by diodes 145a, 145b and artificial light so that system controller 106 can determine if this resulting blend of is sufficient to meet the predetermined intensity. If the blend of light is sufficient, then no further changes need to be made. If the blend of light is insufficient, the system controller 106 is configured to make the necessary adjustments to meet the predetermined intensity or provide an alert to provide notification of the discrepancy. While the above example relates to a situation where the wavelength of light is present in the ambient light but is of an insufficient intensity, the same method is performed if it is determined that a desired wavelength is not present at all within the ambient light. Furthermore, in addition to or instead of using light sensor 164, it should be understood that system controller 106 may also be configured to allow for the manual control of the one or more diodes 145 to selectively emit the respective wavelength of light and/or intensity in vegetative zone 118.

In yet another example, system controller 106 may be configured to control the temperature, humidity, $CO_2$ of the ambient conditions in which the modular units 102 are subjected to based on real-time feedback from environment sensor 168 by, for example, integrating to the HVAC system for the growing facility.

Thus, system controller 106 may be used to optimize the fluid flow, lighting and other environmental conditions for specific crops. Modular units 102/102' and system controller 106 have been developed in tandem to be functional and modular together in a hot swappable, plug and play fashion utilizing pressure stop connections in nutrient feeding system.

System controller 106 may also be configured to initiate and display an alarm on a display in the event of high or low sensor readings, pump failure, pressure loss, water loss, power failure or the occurrence of any other monitored process variable. System controller 106 may also send one or more emergency status messages for each slave system through Short Message Service (SMS), Multimedia Messaging Service (MMS), electronic mail, telephone call or message, or the like, to at least one remote computing device 176a, 176b, wherein an identification of the particular modular unit 102 and sensor that tripped the alarm for troubleshooting are displayed. Active data for each modular unit 102 is cataloged to server 172 to mine for maintenance patterns in order to develop better preventative maintenance. Further, at least one remote computing device 176a, 176b may be in communication with system controller 106 through network 174, wherein at least one remote computing device 176a, 176b includes a software application program module that is configured for displaying the data collected by system controller 106, independently controlling the plurality of lighting units 140, and selectively allowing the fluid to flow from the pressurized reservoir to each modular unit 102 by independently controlling each spray valve 157.

Figure 11:
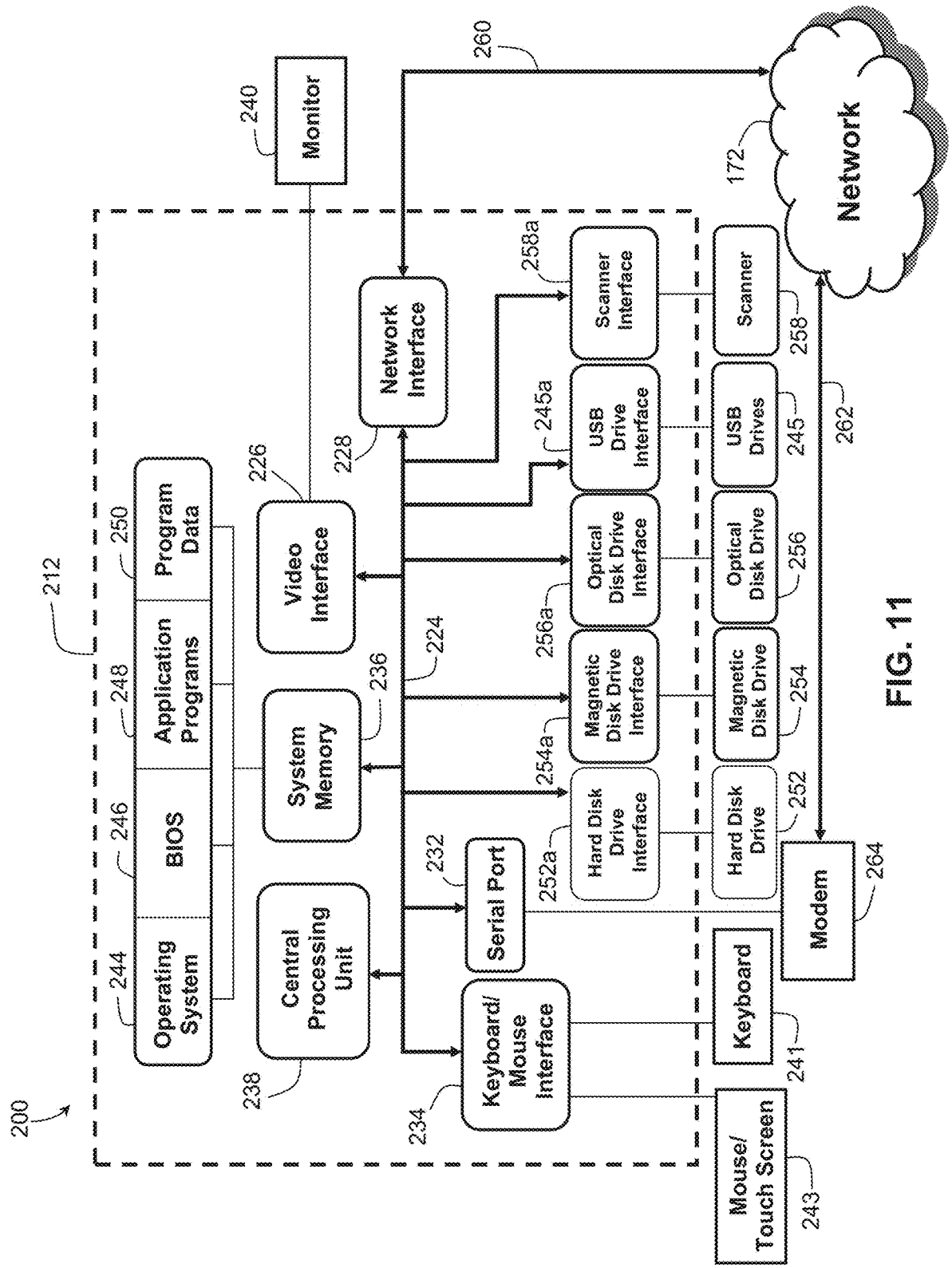
FIG. 11 is a schematic drawing generally illustrating a computing environment in which the invention may be implemented.

FIG. 11 shows an exemplary computing environment 200 that can be used to implement any of the processing thus far described with respect to modular automated growth system 100. For example, computing environment 200 may be representative of system controller 106, server 172, or remote computing devices 176a, 176b. Computer 212 may be a personal computer including a system bus 224 that couples a video interface 226, network interface 228, one or more serial ports 232, a keyboard/mouse interface 234, and a system memory 236 to a Central Processing Unit (CPU) 238. A monitor or display 240 is connected to bus 224 by video interface 226 and provides the user with a graphical user interface to view the data collected from sensors 164, 166, 168 or generated alarms. The graphical user interface allows the user to enter commands and information into computer 212 using a keyboard 241 and a user interface selection device 243, such as a mouse or other pointing device. Keyboard 241 and user interface selection device are connected to bus 224 through keyboard/mouse interface 234. The display 240 and user interface selection device 243 are used in combination to form the graphical user interface which allows the user to view the collected data from sensors 164, 166, 168 and alarms. Other peripheral devices may be connected to computer through serial port 232 or universal serial bus (USB) drives 245 to transfer information to and from computer 212.

The system memory 236 is also connected to bus 224 and may include read only memory (ROM), random access memory (RAM), an operating system 244, a basic input/output system (BIOS) 246, application programs 248 and program data 250. The computer 212 may further include a hard disk drive 252 for reading from and writing to a hard disk, a magnetic disk drive 254 for reading from and writing to a removable magnetic disk (e.g., floppy disk), and an optical disk drive 256 for reading from and writing to a removable optical disk (e.g., CD ROM or other optical media). The computer 212 may also include USB drives 245 and other types of drives for reading from and writing to flash memory devices (e.g., compact flash, memory stick/PRO and DUO, SD card, multimedia card, smart media xD card), and a scanner 250. A hard disk interface 252a, magnetic disk drive interface 254a, an optical drive interface 256a, a USB drive interface 245a, and a scanner interface 258a operate to connect bus 224 to hard disk drive 252, magnetic disk drive 254, optical disk drive 256, USB drive 245 and a scanner 258, respectively. Each of these drive components and their associated computer-readable media may provide computer 212 with non-volatile storage of computer-readable instruction, program modules, data structures, application programs, an operating system, and other data for the computer 212. In addition, it will be understood that computer 212 may also utilize other types of computer-readable media in addition to those types set forth herein, such as digital video disks, random access memory, read only memory, other types of flash memory cards, magnetic cassettes, and the like.

Computer 212 may operate in a networked environment using logical connections with server 172. Network interface 228 provides a communication path 260 between bus 224 and network 172, which allows for the transmission of data collected from sensors 164, 166, 18 and generated alerts using computer 212. This type of logical network connection is commonly used in conjunction with a local area network (LAN). Sensor data and alerts file may also be communicated from bus 224 through a communication path 262 to network 172 using serial port 232 and a modem 264. Using a modem connection between the computer 212 and network 172 is commonly used in conjunction with a wide area network (WAN). It will be appreciated that the network connections shown herein are merely exemplary, and it is within the scope of the present invention to use other types of network connections using computer 212 including both wired and wireless connections.

In use, in accordance with one aspect of the present invention, unpressurized reservoir 146 is filled with a fluid and nutrients suitable for the plants that will be grown using system 100, and pump 150 is used to draw the fluid through filter 148 and fill the pressurized reservoir 152 to a pressure of 100 psi, for example. System controller 106 may be used to activate pump 150. Primary valve 160 is then selectively and variably opened by system controller 106 to feed the fluid, in parallel, though nutrient feed system 154 to each of the modular units 102, 102' that are connected to a pressure stop valve 156. Each spray valve 157 (or pressure regulator 157') is variably and independently adjusted by system controller 106 to allow the fluid to pass to the associated modular unit 102/102'. For aeroponic modules 102, spray nozzles 132 then atomize or mist the fluid in the root zone 116 to feed the plants supported by modular unit 102. Lighting units 140 are controlled by system controller 106 to provide an optimum light duration and intensity. The residual fluid that is not absorbed by the roots is fed through fluid return system 162, and back into unpressurized reservoir 152. During this process, system controller 106 collects and stores data from sensors 164, 166, 168 and will generate an alarm, and optionally send the alarm to remote computing devices 176a, 176b, if the collected data falls outside a predetermined range or threshold value.

One embodiment of system 100 described above has been shown to increase plant density by 8 fold on a 1 to 1 growth area comparison, as well as shorten growth cycles by as much as 25%. As best seen in FIGS. 2-4, modular units 102 may be stacked vertically to obtain higher density per footprint ratios versus traditional farming methods. In one case study, system 100 utilizing aeroponic modules 102 exclusively has shown that it may reduce global warming potential by about 50%, fossil fuel usage by about 95%, nutrient usage by about 82%, and water usage by about 94% in a lifecycle analysis of produce production approach.

From the foregoing, it will be seen that this invention is one well adapted to attain the ends and objects hereinabove set forth together with other advantages which are obvious and which are inherent to the method and apparatus. It will be understood that certain features and sub combinations are of utility and may be employed without reference to other features and sub combinations. This aspect is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A growth system for growing vegetation, the system comprising:
   a plurality of modular growing units configured for supporting vegetation, wherein each of the plurality of modular growing units define a root zone and a vegetative zone;
   a lighting system comprising a plurality of lighting units configured to maintain a constant intensity of light within at least two spectral regions, wherein each of the plurality of lighting units is associated with a respective modular growing unit of the plurality of the modular growing units, wherein each of the plurality of lighting units includes at least one lighting node, wherein the at least one lighting node is configured for selectively emitting one or both of a first wavelength of light from a first spectral region of the at least two spectral regions into the vegetative zone and a second wavelength of light from a second spectral region of the at least two spectral regions into the vegetative zone so as to maintain the constant intensity of light;

an unpressurized reservoir configured for housing a fluid containing one or more nutrients;

a nutrient feeding system configured for fluidly connecting each of the plurality of modular growing units to the unpressurized reservoir in parallel, wherein the nutrient feeding system includes a respective quick connect valve associated with each of the plurality of modular growing units; and a pump in fluid communication between the unpressurized reservoir and the plurality of modular growing units, wherein the pump is configured for drawing the fluid from the unpressurized reservoir to the nutrient feeding system, wherein when one or more of the plurality of modular growing units is connected to the respective quick connect valve, the nutrient feeding system directs the fluid to the modular growing unit, wherein when one or more of the plurality of modular growing units is disconnected from the respective quick connect valve, the quick connect valve is configured for preventing the fluid from flowing from the unpressurized reservoir through the respective quick connect valve, and the other modular growing units connected to the nutrient feeding system remain fluidly connected to the unpressurized reservoir.

2. The system in accordance with claim 1, further comprising a filter in fluid communication between the unpressurized reservoir and the pump.

3. The system in accordance with claim 1, further comprising:
a pressurized reservoir configured to provide pressurized fluid to the nutrient feeding system, wherein the pump is in fluid communication between the unpressurized reservoir and the pressurized reservoir, and wherein the pump is configured for drawing the fluid from the unpressurized reservoir into the pressurized reservoir and pressurizing the fluid in the pressurized reservoir.

4. The system in accordance with claim 3, further comprising a plurality of pressure regulators in fluid communication between the pressurized reservoir and each of the modular growing units, wherein each of the pressure regulators is configured to step down the pressure of the fluid before the fluid is supplied to the associated modular growing unit.

5. The system in accordance with claim 4, further comprising a system controller in communication with the plurality of pressure regulators, wherein the system controller is configured for independently adjusting the plurality of pressure regulators to control the pressure of fluid that is provided to the modular growing units through the nutrient feeding system.

6. The system in accordance with claim 3, wherein at least one of the plurality of modular growing units is a modular aeroponic unit, wherein the growth system further comprises a plurality of spray valves in fluid communication between the pressurized reservoir and the modular aeroponic unit, and wherein each of the plurality of spray valves is configured for selectively allowing the fluid to flow from the pressurized reservoir to the modular aeroponic unit.

7. The system in accordance with claim 6 wherein the modular aeroponic unit includes a top wall, a bottom wall, and a side wall extending between the top wall and the bottom wall, and wherein the top wall, the bottom wall, and the side wall define the root zone,
wherein a portion of the side wall is disposed at an angle of about 95 degrees to about 105 degrees relative to the top wall, wherein the portion of the side wall provides support for the at least one spray nozzle, and
wherein the at least one spray nozzle includes a cone angle of about 90 degrees to about 130 degrees.

8. The system in accordance with claim 6, further comprising a system controller in communication with the plurality of spray valves, wherein the system controller is configured for independently adjusting the plurality of spray valves to control the amount of fluid that is provided to the modular aeroponic unit through the nutrient feeding system.

9. The system in accordance with claim 1, wherein the at least one lighting node includes a plurality of lighting nodes, wherein the system further comprises a system controller in communication with each of the plurality of lighting nodes, and wherein each of the plurality of lighting nodes is controlled independently by the system controller.

10. The system in accordance with claim 9, wherein the system controller is configured to output a pulsed width modulated control signal to selectively control a duration and an intensity of one or both of the first wavelength of light and the second wavelength of light.

11. The system in accordance with claim 1, further comprising:
a light sensor associated with at least one of the plurality of modular growing units, wherein the light sensor is disposed in the vegetative zone, and wherein the light sensor is configured for detecting a spectral dispersion of ambient light in the vegetative zone; and
a system controller in communication with the light sensor and the at least one lighting node, wherein the system controller is configured for receiving data representative of the spectral dispersion detected by the light sensor, and wherein the system controller is configured for selectively controlling the at least one lighting node to emit at least one or both of the first wavelength of light in the vegetative zone and the second wavelength of light in the vegetative zone based on the data representative of the spectral dispersion.

12. The system in accordance with claim 11, wherein the at least one lighting node includes a first light emitting diode and a second light emitting diode, wherein the first light emitting diode is configured to emit the first wavelength of light, and wherein the second light emitting diode is configured to emit the second wavelength of light.

13. The system in accordance with claim 12, wherein the system controller is configured to output a pulsed width modulated control signal to selectively control a duration and an intensity of one or both of the first wavelength of light emitted by the first light emitting diode and the second wavelength of light emitted by the second light emitting diode, to maintain the constant intensity of the first and second wavelengths of light.

14. The system in accordance with claim 9, further comprising one or more sensors in communication with the system controller, wherein the system controller is configured for collecting data related to system using the one or more sensors.

15. The system in accordance with claim 14, wherein the system controller includes a display for displaying the data collected from the one or more sensors.

16. The system in accordance with claim 14, wherein the one or more sensors include a light sensor, an environmental sensor, or a nutrient solution sensor.

17. The system in accordance with claim 14, further comprising a memory in communication with the system controller, wherein the data collected from the one or more sensors is stored in the memory, wherein the memory is in communication with the system controller through a network.

18. The system in accordance with claim 14, further comprising at least one remote computing device in communication with the system controller through a network, wherein the at least one remote computing device includes a software application program that is configured for displaying the data collected by the system controller, independently controlling the plurality of lighting units, and selectively allowing the fluid to flow from the unpressurized reservoir to the plurality of modular growing units.

19. The system in accordance with claim 1, further comprising a fluid return system in fluid communication with the unpressurized reservoir, wherein each of the plurality of modular growing units include an outlet that is in fluid communication with the fluid return system.

* * * * *